(12) United States Patent
Yanakiev et al.

(10) Patent No.: US 8,733,183 B1
(45) Date of Patent: May 27, 2014

(54) LASH CROSSING DETECTION USING A SHAFT TORQUE SENSOR

(71) Applicant: Ford Global Technologies, LLC, Dearborn, MI (US)

(72) Inventors: Diana Yanakiev, Birmingham, MI (US); Eric H. Tseng, Canton, MI (US); Gregory M. Pietron, Canton, MI (US); Yuji Fujii, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 19 days.

(21) Appl. No.: 13/746,576

(22) Filed: Jan. 22, 2013

(51) Int. Cl.
*G01M 13/02* (2006.01)
*G01L 3/02* (2006.01)

(52) U.S. Cl.
USPC ........................................ 73/862.191; 73/162

(58) Field of Classification Search
None
See application file for complete search history.

(56) References Cited

U.S. PATENT DOCUMENTS

| | | | |
|---|---|---|---|
| 6,574,535 B1 | 6/2003 | Morris et al. | |
| 6,910,990 B2 | 6/2005 | Doering et al. | |
| 7,223,203 B2 | 5/2007 | Yamazaki et al. | |
| 7,341,541 B2 | 3/2008 | Houtman et al. | |
| 7,440,832 B2 | 10/2008 | Steen et al. | |
| 7,563,200 B2 | 7/2009 | Martin | |
| 7,563,201 B2 | 7/2009 | Martin | |
| 7,577,507 B2 | 8/2009 | Morris | |
| 7,834,494 B2 | 11/2010 | Blanding et al. | |
| 7,881,846 B2 | 2/2011 | Reinke et al. | |
| 7,930,949 B2 | 4/2011 | Singh | |
| 8,046,142 B2 | 10/2011 | Morris et al. | |
| 2010/0174431 A1 | 7/2010 | Fukumura et al. | |
| 2012/0109477 A1 | 5/2012 | McDonnell et al. | |

FOREIGN PATENT DOCUMENTS

JP        63215934 A        9/1998

*Primary Examiner* — Lisa Caputo
*Assistant Examiner* — Brandi N Hopkins
(74) *Attorney, Agent, or Firm* — James Dottavio; MacMillan, Sobanski & Todd, LLC

(57) ABSTRACT

A method for detecting backlash and adjusting driveline variables, includes measuring torque transmitted between components across a torsional discontinuity, measuring driveline twist across the discontinuity, using a ratio of driveline twist divided by torque and an inverse of driveline stiffness to determine whether the driveline is entering, exiting or in a backlash zone, and using measured driveline twist and torque at the backlash zone to adjust reference values of driveline twist and torque.

11 Claims, 4 Drawing Sheets

US 8,733,183 B1

LASH CROSSING DETECTION USING A SHAFT TORQUE SENSOR

BACKGROUND OF THE INVENTION

1. Field of the Invention

This invention relates generally to detecting a lash crossing in a motor vehicle driveline particularly with the use of a device that produces signals indicating the magnitude of torque being transmitted and the directional sense of the transmitted torque.

2. Description of the Prior Art

Automotive drivetrains include meshed gear teeth that exhibit deadband when the direction of torque applied to them changes, as shown in the diagram of FIG. 1 and in FIG. 2.

Such deadband causes discontinuity of the transmitted torque and excitation of the driveline, as the shafts feature certain compliance. Due to that, the deadband is typically called "backlash" or being in the deadband zone during the change of direction of torque: "lash crossing." If there were no backlash associated with the meshed gears, the shaft twist to torque relationship could have been expressed using the torsional spring equation (Hooke's law): $t = K_s q$, where Ks is the shaft stiffness.

Lash crossing has been one of the key factors contributing to drivability issues. There has been a continuing effort in the automotive control engineering community to address the problem of backlash via predicting, detecting, avoiding, and mitigating the effects of lash crossing.

Using the measurements available on production vehicles today, reliable detection of the crossing the deadband zone is a formidable challenge. Various publications explore the Hooke's law to derive the driveline torque based on shaft position sensors, which are typically used for angular speed and known as "speed sensors." Others use the speed difference across the unlocked torque converter as an indication of torque direction at the input of the gearbox.

The numerical and resolution problems associated with estimation methods solely based on speed sensors position (tooth count) readings, remain limited to higher speed operation and are sensitive to various noise factors: synchronization, resolution at low speeds, engine and road disturbances, measurement and numerical errors, to name a few.

SUMMARY OF THE INVENTION

A method for detecting backlash and adjusting driveline variables, includes measuring torque transmitted between components across a torsional discontinuity, measuring driveline twist across the discontinuity, using a ratio of driveline twist divided by torque and an inverse of driveline stiffness to determine whether the driveline is entering, exiting or in a backlash zone, and using measured driveline twist and torque at the backlash zone to adjust reference values of driveline twist and torque.

The method avoids the numerical and resolution problems associated with estimation methods solely based on speed sensors position readings, high speed operation and sensitivity to various noise factors including synchronization, resolution at low speed, engine and road disturbances and measurement error.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
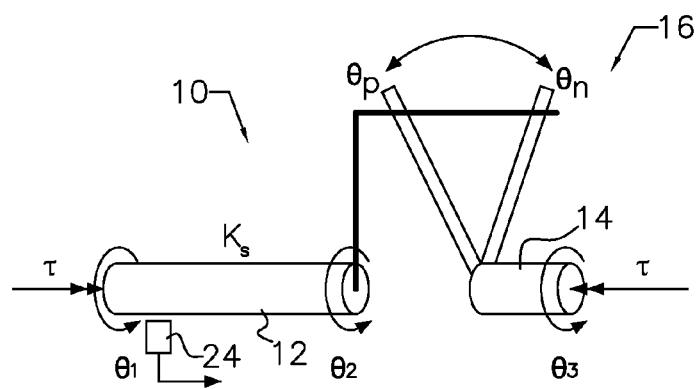
FIG. 1 is a schematic diagram illustrating two shafts of a driveline with deadband.
Figure 2:
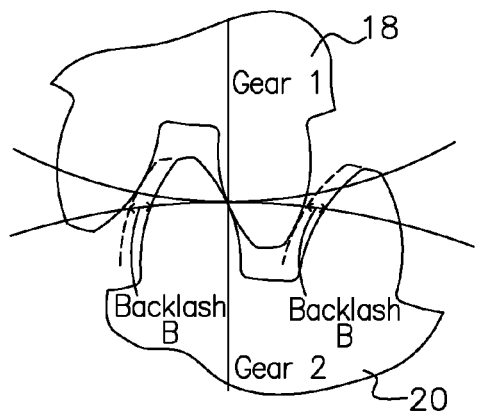
FIG. 2 is an end view of meshing gear teeth showing backlash between the gears

FIG. 1 shows a driveline 10 having two shafts 12, 14 connected by a torsional discontinuity 16 in which backlash can occur. The discontinuity 16 is be represented by the meshing gears 18, 20 of FIG. 2, each gear being secured to one of the shafts 12, 14. A production-suitable magneto-elastic shaft torque sensor 24 having ability to measure torque directly at a transmission input shaft or output shaft is enabling many features in vehicle control. The dynamic response of the shaft torque sensor 24 is within a fraction of a millisecond and its accuracy is far superior to any currently available on-board torque estimates. Hence, this torque measurement can enable robust backlash detection and useful feedback for drivability control of motor vehicles.

Figure 3:
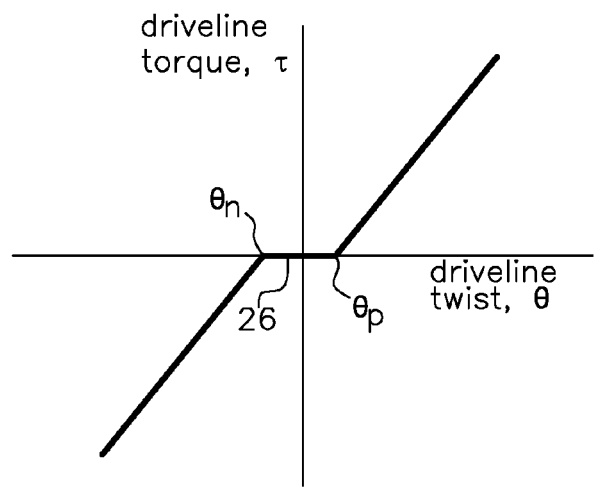
FIG. 3 is a graph showing the variation of driveline torque and twist from negative to positive twist including discontinuities where entry into and exit from backlash occur.

FIG. 3 is a graph showing the variation of driveline torque $\tau$ and twist $\theta$ from a negative twist angle to positive twist angle including discontinuities $\theta_n$, $\theta_p$ where entry into or exit from a backlash zone 26, i.e., a lash crossing occur.

Theoretically, a zero crossing torque measurement at a shaft close to the main source of deadband, which occurs typically at the differential, should directly indicate the lash crossing. In practice, however, there are several sources of uncertainty that can be eliminated by combining information from the torque sensor and speed sensor signals. Offset in the torque sensor reading, due to either measurement noise or location on the driveline, can cause the lash crossing to be at a torque signal different from zero. Utilizing the speed sensors teeth count information in the torque region around zero, can help pinpoint the lash crossing and, in turn, zero out the torque measurement offset.

The discontinuity of the slope Ks, as seen in FIG. 1, can be used to determine when the driveline is in the non-contact zone. More precisely, the torque-twist relationship is as follows:

$$K_s(\theta - \theta_p), \theta > \theta_p > 0$$

$$\tau = 0, \theta_n < \theta < \theta_p, |\theta_n| = |\theta_p|$$

$$K_s(\theta - \theta_n), \theta < \theta_n < 0$$

where:

$\theta$ is measured angle of one side of the torsional discontinuity with respect to the other side $\theta_p$ is the reference positive direction lash angle $\theta_n$ is the reference negative direction lash angle and $\tau$ is torque on the shaft element When the driveline is in the deadband zone 26, slope Ks is zero.

Figure 4:
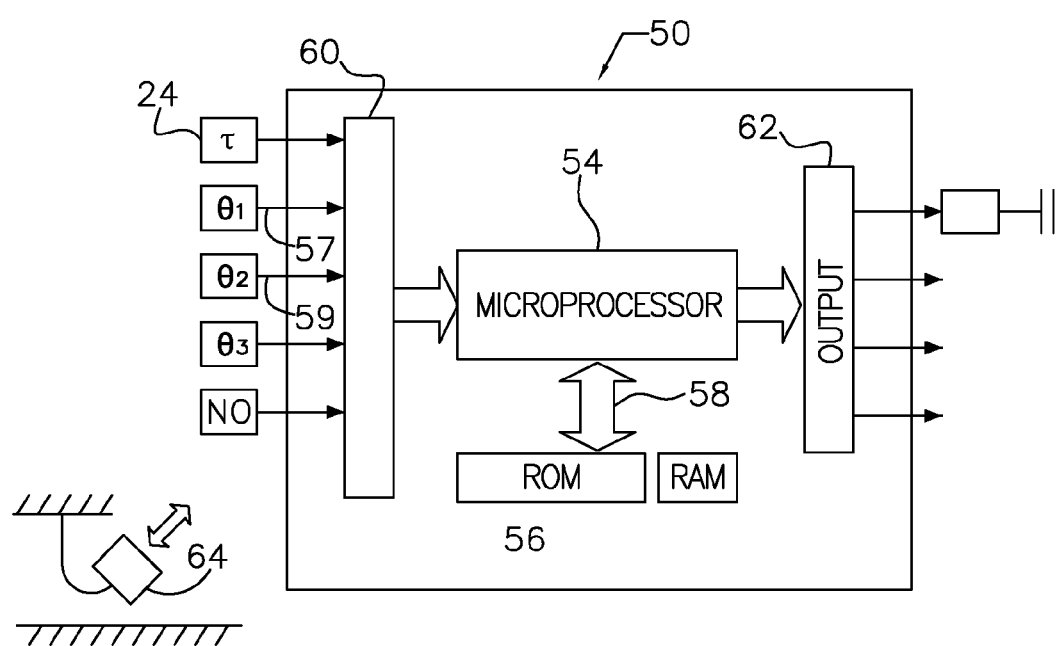
FIG. 4 is a schematic diagram of an electronic controller for controlling the torque converter clutch.

FIG. 4 illustrates a controller 50 comprising an electronic microprocessor 54 accessible to electronic memory 56, which contains control algorithms; a data communication bus 58 interconnecting components of the controller; inlet ports 60 communicating the controller with various powertrain sensors, and outlet ports 62 communicating signals from the controller in response to the results produced by execution of the algorithms. The RAM component of memory 56 contains reference data associated with torque sensor 24 including $\epsilon$ and reference data related to driveline 10 including Ks, $\theta$p, $\theta$n, a signal 55 representing torque $\tau$ measured at gearbox input or output, and the transmission angular displacement or twist $\theta 1$, $\theta 2$. The input signals to controller 50 include wheel angular displacement or twist $\theta 3$, being transmitted typically by the ABS module.

There are many ways this can be used to detect the backlash zone using the measurement of shaft torque and the shaft twist based on measured position count of the differential output shaft speed and the wheel speed sensors.

The most direct way to determine that the driveline is in the non-contacting (backlash) region is by observing that the torque measurement ($\tau$) is constant, while the twist ($\theta$) measurement (or estimation) is changing. Note that using the torque signal only to detect when lash crosses zero may not be sufficient, as the signal can have offset or measurement noise.

One way would be to calculate the ratio ($\tau/\theta$) and, when close to 0, to conclude that the driveline is in the backlash region.

Another method, which is robust to numerical errors and other noise factors, is to use the inverse ratio ($\theta/\tau$). That ratio will increase to large magnitudes as soon as the driveline enters the non-contacting region, because the measured torque will be close to zero. An algorithm 30 of this method is described with reference to FIG. 5. At step 32 a test is made to determine if the measured torque $|\tau|<\epsilon$, where $\epsilon$ is the measurement error range specified for the torque sensor 24 in the vicinity where the torque sensor indicates zero torque is being transmitted in the driveline 10. $\epsilon$ is the maximum allowed measurement torque error of the torque sensor 24 at a zero torque reading, where a lash crossing is occurring. For example, a torque sensor specification might have a tolerance $\epsilon$ of +/−5 Nm for torque values up to 100 Nm and 5% error for larger torques.

If the result of test 32 is false, control passes to step 44, which is explained below.

If the result of test 32 is true, at step 36 a test is made to determine whether $|\theta/\tau|>\delta$, where $\delta$ is the slope detection threshold, to be calibrated accordingly with Ks. Since $\tau = Ks\,\theta$, then $\theta/\tau = 1/Ks$. Therefore, the angular displacement threshold $\delta$ is related to 1/Ks. $|\theta/\tau|$ should be calibrated as a scalar greater than the estimated 1/Ks, to ensure robustness. The key is that, in the region where a lash crossing occurs, the torque $\tau$ is approximately zero; therefore, the division of angular displacement $\theta$ by torque $\tau$ results in a very large number for $\theta/\tau$.

Therefore, if the result of test 36 is true, driveline 10 is operating in the backlash zone 26. Step 36 can be made more robust, e.g., by checking also $|\theta/(\tau-\epsilon)|>\delta$, $|\theta/(\tau+\epsilon)|>\delta$ for a more robust detection in the presence of noise.

A test is made at step 38 to determine whether the lash flag is zero. If the lash flag is zero, no change in the lash state has occurred since the last execution of algorithm 30. Lash flag is set to 1 at step 40 indicating entry into the backlash zone 26, and lash flag is reset to 0 at step 46 indicating exit from the backlash zone. Therefore, because the driveline 10 is in the lash zone according to test 36, and because the driveline was exiting the lash zone at the last execution of the algorithm according result of test 38, step 40 related to the driveline currently entering the backlash zone 26.

It is helpful to determine whether the driveline 10 is transitioning in and out of lash crossing backlash zone 26. If step 36 indicates that driveline 10 is currently operating in the backlash zone 26, thereafter different logic paths are taken, depending on whether transitioning is occurring or continuing in the previous lash state is occurring.

When the results of steps 36 and 38 are both true, indicating that the driveline is entering the backlash region zone between $\theta_p$ and $\theta_n$, at step 40 the offset (if any) of the driveline angular displacement can be eliminated by either (i) immediate resetting it to 0; (ii) filtering to 0; or (iii) gradual adaptation over time. For example, if $\theta_p$ and $\theta_n$ are expected to occur at 3 degrees, but successive executions of algorithm 30 indicate that $\theta_p$ or $\theta_n$ occur at 5, 6, 5, 4 degrees, the currently measured shaft twist $\theta$ can be compared to the model stored values, $\theta$p and $\theta$n, and $\theta$p and $\theta$n can be adjusted in memory 56 into conformance with the measured twist $\theta$.

At step 40 the lash flag is set to 1 indicating that the lash state has changed since the last execution of algorithm 30. After executing step 40, control passes to step 34 where execution of algorithm 30 is terminated.

When the result of step 36 is true and the result of step 38 is false, indicating that the driveline 10 is operating is the backlash zone 26, at step 42 the torque $\tau$ offset is adapted, i.e., memory 56 is updated to account for the $\tau$ offset. After step 36 indicates that the driveline is operating in the backlash zone 26, the torque measurement produced by torque sensor 24 should be 0. If that measurement is other than zero, the measured torque is the torque offset or torque error, which can be used gradually or instantaneously corrected in memory 56 for the torque error.

After executing step 42, control passes to step 34 where execution of the algorithm is terminated.

If the result of test 36 is false, indicating that torque and twist are low and driveline 10 is not operating in the backlash region 26, a test is made at step 44 to determine whether the lash flag is equal to 1. If the result of test 44 is false, control passes to step 34, where execution of the algorithm is terminated.

If the result of test 44 is true, the lash flag being zero indicates that the lash state has not changed since the flag was set upon entry into the backlash zone 26 at the last execution of algorithm 30. Therefore, the driveline is exiting the backlash zone 26. At step 46 the offset (if any) of the driveline twist $\theta$ can be eliminated, i.e., adjusted by either (i) immediate resetting twist to 0; (ii) filtering to 0; or (iii) gradual adaptation over time. For example, if $\theta_p$ or $\theta_n$ are expected to occur at 3 degrees, but successive executions of algorithm 30 indicate that $\theta_p$ or $\theta_n$ occur at 5, 6, 5, 4 degrees, the currently measured shaft twist $\theta$ can be compared to the model stored values, $\theta$p and $\theta$n, and $\theta$p and $\theta$n can be adjusted in memory 56 into conformance with the measured twist $\theta$. At step 46 the lash flag is reset to 0.

At step 48, the gap in terms of driveline twist $|\theta p - \theta n|$ can be determined for the current gear in which the transmission is operating. More precisely, $\theta$p and $\theta$n can be determined and drift from the driveline twist estimate or twist measurement is eliminated upon recognizing that θp and θn are symmetric around 0. Upon exiting the backlash zone 26, the driveline crosses θp or θn, as illustrated in FIG. 3. If the measured angle at the θp or θn transitions does not coincide with the expected values of θp and θn stored in memory 56, those values can be adjusted. For example, if θp is 4.0 degrees and θn is 2.0 degrees, |θp−θn| is adjusted to 3.0 degrees, i.e. they converge to the corrected center value 3.0 degrees.

Figure 5:
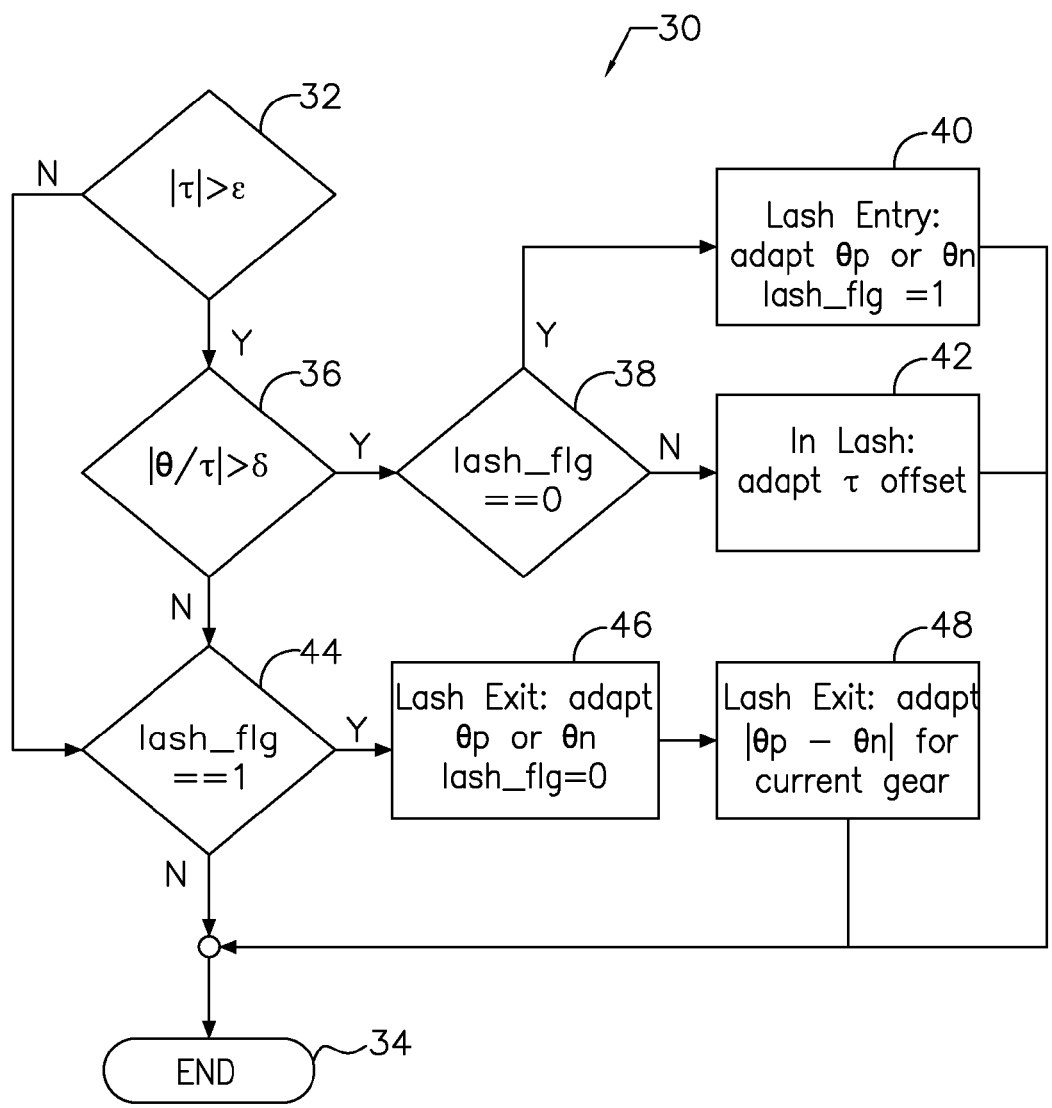
FIG. 5 is an algorithm for lash crossing and size detection, using shaft torque and twist measurements.
Figure 6:
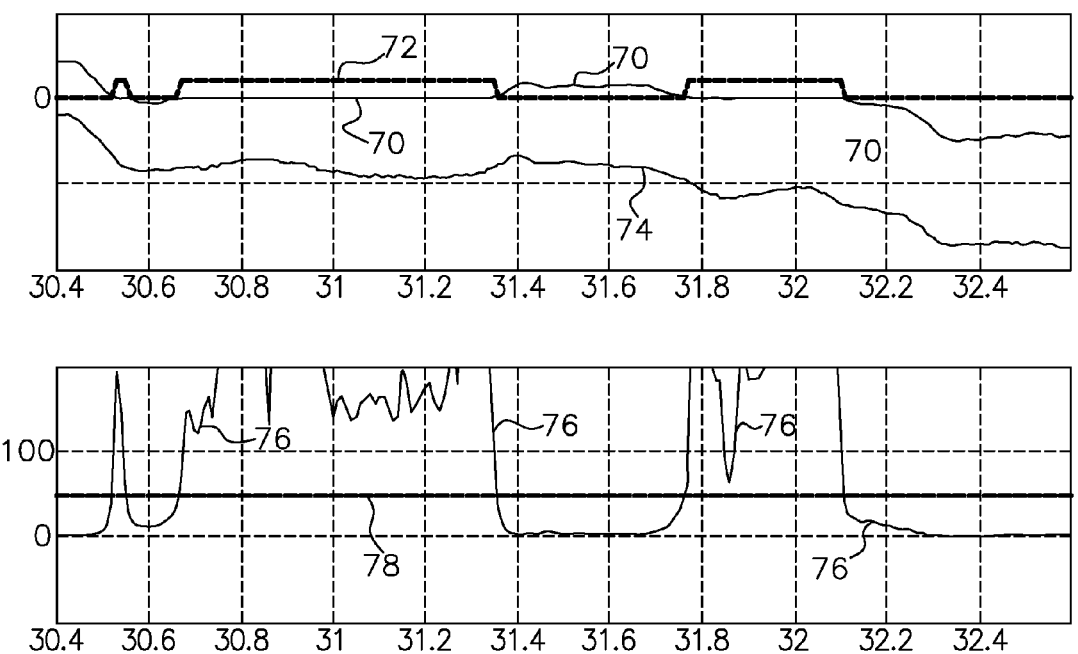
FIG. 6 shows time traces of lash crossing detection using the ratio between crude estimate of twist and measured shaft torque.

The time traces in FIG. 5 show the shaft torque measurement 70, the lash detection flag (top) 72, a crude estimate of driveline twist 74, the signal 76 resulting from the division of the estimated driveline twist 74 by the torque measurement 70, and the threshold δ 78.

Since vehicle data indicating the twist angle signal produced by the driveline shaft speed sensors is unavailable, the estimated shaft twist 74 is obtained via crude integration of a wheel speed sensor and the transmission output shaft speed sensor signals.

In accordance with the provisions of the patent statutes, the preferred embodiment has been described. However, it should be noted that the alternate embodiments can be practiced otherwise than as specifically illustrated and described.

The invention claimed is:

1. A method for detecting backlash, comprising:
   (a) measuring torque transmitted between components across a torsional discontinuity;
   (b) measuring driveline twist across said discontinuity;
   (c) using a ratio of said driveline twist divided by said torque and driveline stiffness to determine whether the driveline is entering, exiting or in a backlash zone.

2. The method of claim 1, further comprising:
   using measured driveline twist and torque at the backlash zone to adjust reference values of driveline twist and torque.

3. The method of claim 1, wherein step (a) further comprises:
   using a torque sensor to measure torque transmitted between components across the torsional discontinuity.

4. The method of claim 1, wherein step (a) further comprises:
   using a torque sensor to measure torque transmitted between components across the torsional discontinuity; and
   determining that an absolute magnitude of said torque is less than a measurement error tolerance range specified for the torque sensor when the torque sensor indicates said torque is zero.

5. The method of claim 1, wherein step (b) further comprises:
   using angular displacement sensors located at opposite sides of the torsional discontinuity to measure driveline twist across said discontinuity.

6. The method of claim 1, wherein step (c) further comprises:
   using an absolute magnitude of a ratio of said driveline twist divided by said torque and an inverse of driveline stiffness to determine whether the driveline is entering, exiting or in a backlash zone.

7. The method of claim 1, wherein steps (a) and (c) further comprise:
   using a torque sensor to measure torque transmitted between components across the torsional discontinuity; and
   determining that an absolute magnitude of a ratio of said driveline twist divided by a difference between said torque and a measurement error tolerance range specified for the torque sensor when the torque sensor indicates zero torque is being transmitted is less than an inverse of driveline stiffness.

8. The method of claim 1, wherein step (d) further comprises:
   using measured driveline twist measured at an entry of the driveline into the backlash zone to adjust a reference driveline twist corresponding to an entry of the driveline into the backlash zone.

9. The method of claim 1, wherein step (d) further comprises:
   using measured driveline torque measured while the driveline operates in the backlash zone to adjust a reference driveline torque corresponding to operation of the driveline while in the backlash zone.

10. The method of claim 1, wherein step (d) further comprises:
    using measured driveline twist measured at an exit of the driveline from the backlash zone to adjust a reference driveline twist corresponding to an exit of the driveline from the backlash zone.

11. The method of claim 1, wherein step (d) further comprises:
    using an absolute magnitude of a measured difference in driveline twist measured at an exit of the driveline from the backlash zone to adjust a reference difference in driveline twist corresponding to an exit of the driveline from the backlash zone.

* * * * *